US010417310B2

(12) United States Patent
Biswas et al.

(10) Patent No.: US 10,417,310 B2
(45) Date of Patent: Sep. 17, 2019

(54) CONTENT INKER

(71) Applicant: Microsoft Technology Licensing, LLC, Redmond, WA (US)

(72) Inventors: Arindam Biswas, Telangana (IN); Mahesh Kumar, Telangana (IN); P. M. S. Subba Rao, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/618,516

(22) Filed: Jun. 9, 2017

(65) Prior Publication Data

US 2018/0357206 A1 Dec. 13, 2018

(51) Int. Cl.
*H03M 7/30* (2006.01)
*G06F 17/21* (2006.01)
*G06K 9/00* (2006.01)
*G06F 17/24* (2006.01)

(52) U.S. Cl.
CPC .......... *G06F 17/212* (2013.01); *G06F 17/242* (2013.01); *G06K 9/00416* (2013.01); *G06F 17/211* (2013.01); *G06F 17/241* (2013.01)

(58) Field of Classification Search
CPC .... G06F 17/212; G06F 17/241; G06F 17/242; G06K 9/00416
USPC ........................................................ 715/232
See application file for complete search history.

(56) References Cited

U.S. PATENT DOCUMENTS

| | | | |
|---|---|---|---|
| 7,218,783 B2 | 5/2007 | Bargeron et al. | |
| 7,284,192 B2 | 10/2007 | Kashi et al. | |
| 7,421,448 B2 | 9/2008 | Spork | |
| 7,551,187 B2 * | 6/2009 | Agrawala | G06F 3/04883 345/660 |
| 7,574,048 B2 * | 8/2009 | Shilman | G06F 3/04883 345/156 |
| 7,844,907 B2 | 11/2010 | Watler et al. | |
| 8,190,990 B2 | 5/2012 | Le | |

(Continued)

FOREIGN PATENT DOCUMENTS

WO 2002091193 A1 11/2002

OTHER PUBLICATIONS

Denoue, et al., "An annotation tool for Web browsers and its applications to information retrieval", In Proceedings of Content-Based Multimedia Information Access, vol. 1, Apr. 12, 2000, pp. 180-195.

*Primary Examiner* — Cesar B Paula
*Assistant Examiner* — Luu-Phuong T Nguyen
(74) *Attorney, Agent, or Firm* — International IP Law Group, PLLC

(57) ABSTRACT

Various systems and methods for inking reflowable content are described herein. In an example, the system includes a processor and storage with instructions that in response to execution on the processor cause the processor to identify inking input. In an example, the inking input is identified in a content area of a reflowable document. In an example, the system capture an image of the inking input and the content area indicated by the inking input. In an example, the system may also capture an ink stroke of the inking input. The ink stroke of the inking input and the image of the inking input and content area can be provided for display in response to a detection that the reflowable document is being displayed in a modified context.

19 Claims, 6 Drawing Sheets

(56) References Cited

U.S. PATENT DOCUMENTS

| | | | |
|---|---|---|---|
| 8,515,176 B1* | 8/2013 | Sankaranarayanan | G06K 9/00463 |
| | | | 382/185 |
| 9,430,141 B1* | 8/2016 | Lu | G06F 17/241 |
| 2002/0010707 A1* | 1/2002 | Chang | G06F 17/211 |
| | | | 715/205 |
| 2002/0049787 A1* | 4/2002 | Keely | G06F 17/211 |
| | | | 715/205 |
| 2004/0095394 A1* | 5/2004 | Fox | G06F 3/0481 |
| | | | 715/800 |
| 2004/0205542 A1 | 10/2004 | Bargeron et al. | |
| 2004/0252888 A1* | 12/2004 | Bargeron | G06F 17/242 |
| | | | 382/188 |
| 2007/0174762 A1 | 7/2007 | Plant | |
| 2009/0199083 A1 | 8/2009 | Sar et al. | |
| 2009/0204882 A1 | 8/2009 | Hollander et al. | |
| 2010/0042615 A1 | 2/2010 | Rinearson | |
| 2013/0132814 A1 | 5/2013 | Mangini et al. | |
| 2014/0047332 A1* | 2/2014 | Liu | G06F 17/24 |
| | | | 715/273 |
| 2015/0026552 A1* | 1/2015 | Horie | G06F 17/24 |
| | | | 715/211 |
| 2015/0100876 A1* | 4/2015 | Neugebauer | G06F 17/241 |
| | | | 715/233 |
| 2015/0339050 A1* | 11/2015 | Vong | H04L 65/403 |
| | | | 345/173 |
| 2016/0070686 A1* | 3/2016 | Yu | G06F 17/241 |
| | | | 715/230 |
| 2016/0070688 A1* | 3/2016 | Yao | G06F 17/241 |
| | | | 715/232 |

* cited by examiner

CONTENT INKER

BACKGROUND

Inking content can be associated with a user drawing, sketching, or underlining portions of a document on a screen using freehand techniques through a touch interface. Inking content can be stored as data separate from original data of a document with additional indications of how the inking data is associated with the original data in a document. Some documents are laid out dynamically such that the same content appears in a different layout depending on its display environment.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An example provides a system for inking reflowable content. In an example, a system for inking reflowable content includes a processor, and a storage with instructions that when executed on the processor cause the processor to identify inking input that occurs in a content area of a reflowable document. In an example, the inking input is identified in a content area of a reflowable document. In an example, the system capture an image of the inking input and the content area indicated by the inking input. In an example, the system may also capture an ink stroke of the inking input. The ink stroke of the inking input and the image of the inking input and content area can be provided for display in response to a detection that the reflowable document is being displayed in a modified context.

An example provides a method for inking reflowable content. In an example, the method may include identifying inking input that occurs in a content area of a reflowable document. In an example, the method includes identifying an ink stroke in a content area of a reflowable document. In an example, the method includes capturing an image of the inking input and the content area indicated by the inking input. In an example, the method may also capture an ink stroke of the inking input. The ink stroke of the inking input and the image of the inking input and content area can be provided for display in response to a detection that the reflowable document is being displayed in a modified context.

An example provides a computer-readable storage device that stores instructions that, in response to an execution by a processor, cause the processor to identify inking input. In an example, the inking input occurs in a content area of a reflowable document. The computer-readable storage device can store instructions that in response to execution by a processor, an ink stroke can be captured from the inking input. Similarly, an image can be capture of an image of the inking input, and the content area indicated by the inking input. The computer-readable storage device can store instructions that in response to execution by a processor, provide the captured image and captured ink stroke for display in response to a detection that the reflowable document is being displayed in a modified context.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
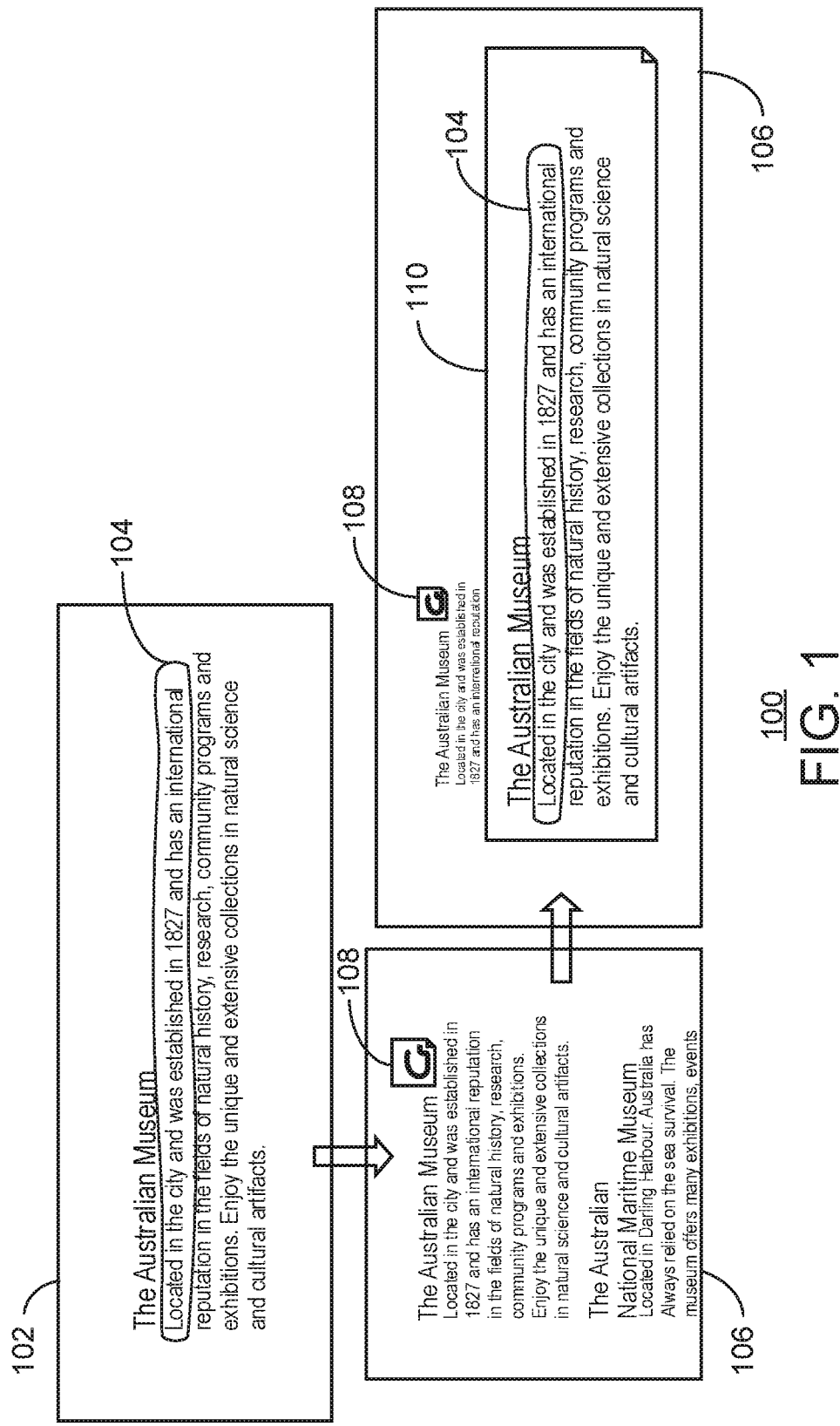
FIG. 1 is a schematic of an example visualization of inking reflowable content and captured images created when the content is displayed in a different context.

In this disclosure, inking is disclosed for reflowable content like web pages and electronic publications where the layout of the content can be modified by users. As used herein, the term reflowable refers to a feature of certain types of content, such as text, allowing the content to be broken up at different points in order to fill a given space or layout while maintaining coherence as content. For example, an image may be distorted if a line break is inserted vertically halfway through the image and the rest of the image is continued in another column of the next page. Text content is reflowable as text can be split mid-sentence or even in the middle of words so that the space allocated to the text can change without changing the meaning of the words. Indeed reflowable text sentences keep their coherence as a concept to a user even when separated in the middle by a line or page break.

When a layout for reflowable content is changed, this change can be referred to as a context change. As used herein, a context change can be a switch between a device profile orientation and a device landscape orientation, among others. In some examples, a context change can be a change in an indicated font or font size. In an example, a context change can be a modification to a display in physical shape, size, or through software settings that could change the way content is displayed. In some embodiments, a context change occurs when content is sent from a first device to a second differently sized device. In an example, a user could change font size, font spacing, or the number of columns a document uses to display content.

As used herein, inking refers to marks made by a user on content provided to the user on a display. For example, if a user retrieved a web page using the internet, a user could make digital marks on that page including underlining, circling, highlighting, margin marks, bulleting, and the like. The digital marks by a user on the content of the webpage are considered inking marks. The presently disclosed technique allows inking to be viewed inline on reflowable documents and in different contexts. The presently disclosed technique allows reflowable content accessed at a certain location to include that inking for any user that accesses the content using the same location address, such that saving a separate inked document for sharing can be avoided. Further, the present disclosure allows the content to remain reflowable for display in future different contexts and can avoid freezing the content such that the document's original flexibility could be lost.

The term "logic" encompasses any functionality for performing a task. The operations illustrated in the flowcharts corresponds to logic for performing that operation. An operation can be performed using software, hardware, firmware, physical electronic circuits, and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, an application running on a server and the server can be a component. One or more components can reside within a process and a component can be localized on one computer and/or distributed between two or more computers.

Furthermore, the claimed subject matter may be implemented as a method, apparatus, or article of manufacture using programming and/or engineering techniques to produce software, firmware, hardware, or any combination thereof to control a computer to implement the disclosed subject matter.

Computer-readable storage devices or media can include and are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

FIG. 1 is a schematic of an example of visualization 100 of inking reflowable content and captured images created when the content is displayed in a different context. FIG. 1 includes a first context 102 where a user inking mark 104 has circled a portion of text. The content from the first context 102 can be reflown into second context 106. In an example, the second context shows that the content is being displayed with a narrower column, and other contextual changes could also be implemented as discussed above.

In the second context, the user inking may or may not be displayed inline depending on the type of inking done by the user. In an example where the user inking mark 104 was determined to be the circling of content, the user inking may not be displayed inline, and a pointer icon 108 could be included with the reflown content. The pointer icon 108 indicates that a user inking mark 104 is made on nearby content, and that if a viewer wishes to view the user inking mark 104 the viewer could click or otherwise activate the pointer icon 108.

A third panel corresponding to the second context 106 shows how the user inking mark 104 could be displayed in the second context 106. When the pointer icon 108 is clicked or otherwise activated, then a captured image 110 could be displayed in a flyout panel. The captured image 110 can present the user inking mark 104 as an image matching the original context in which the user inking mark 104 was detected. Further, a viewer could click or activate the pointer icon 108 to minimize or shrink the captured image 110 such that it does not block other text in the second context 106.

In an example, the captured image 110 may be captured when a user inking mark 104 is made in the first context 102. For example, the user inking mark 104 and any surrounding or nearby content including reflowable text in the first context 102 may be captured as a static image. In an example, this static image of the user inking mark 104 and text in the first context 102 may be displayed as the captured image 110 in the second context 106 or any other context that is displaying the same content.

This separately recorded captured image 110 allows the original content to be reflown as desired, while also ensuring that the user inking mark 104 is not mishandled. User inking marks can include a number of shapes and intended meanings. Unlike text based sentences, user inking marks may lack reflowable characteristics. For example, if the user inking mark is a bullet or a circle shown next to certain text, a simple resizing could incorrectly place the circling or bulleting mark against unintended content. The presently disclosed technique allows the original context of the user inking mark 104 to be preserved and selectively displayed upon activation of a pointer icon 108 if a viewer wishes to see the user inking mark 104. As discussed more fully below in FIG. 3, some user inking marks are reflowable and some are not, so these user inking marks may be handled differently depending on the type of user inking mark that is made. While the FIG. 1 shows arrows between the two panels in the second context 106, these two panels show different states that can occur depending on the input and actions of a viewer.

In another example of the disclosed technique, content can be displayed on a webpage and after a user makes inking marks in a first context, a browser may display this webpage in a resized second context such that contents that were originally multi-column are now laid out in a single column. In this second context with a smaller column width, the user can draw additional user inking marks such as a circle around some text. In an example, this user inking mark made in the second context can be saved and displayed when and if the content is once again displayed in the first context. Returning to a first context would allow the user inking marks made in that context to be show as they were made in that first context without the pointer icon or captured image. Returning to a first context after a user inking mark is made in the second context may result in displaying a pointer icon in the first context for the second user inking mark.

In FIG. 1, the user inking mark 104 may be stored with the surrounding text as a separate layer. In this separate layer the user inking mark may have a specific location and path defined. For example, if the top left corner of a display is considered 0, 0, then a user inking mark may have a path that starts at an offset from those top left corner coordinates and have a beginning point of 100, 200. Using these coordinates as frames of reference along with the content itself, the pointer icon can be located in the second context through scaling of the coordinate starting points of the user inking mark 104. Further, the drawing of the user inking path may be recorded as an animated action and redisplayed as an animation in the second context 106 upon the display of the captured image 110.

Figure 2:
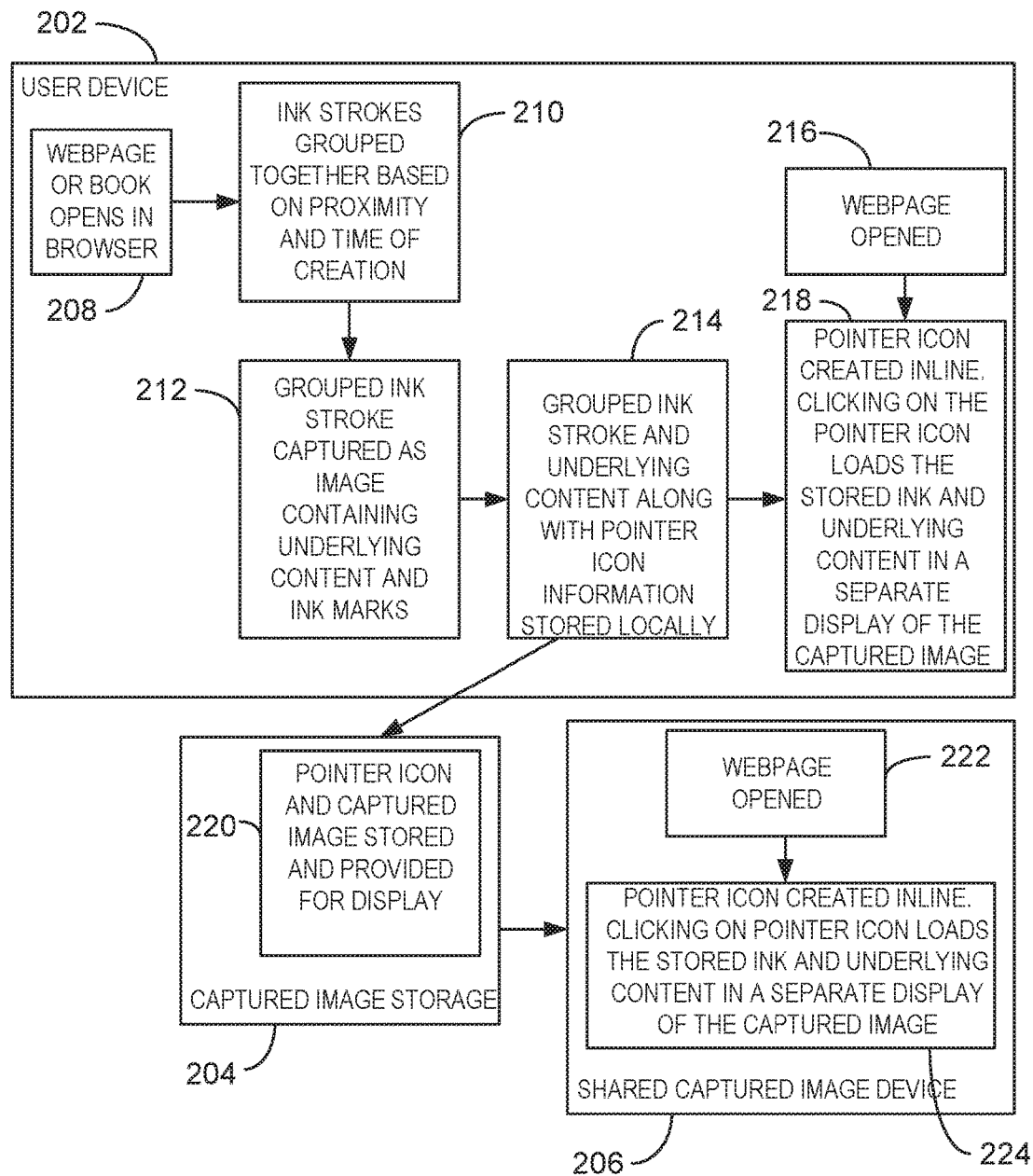
FIG. 2 is a schematic of an example process, device, and time progression of content that is being inked and displayed in a number of contexts.

FIG. 2 is a schematic of an example process, device, and time progression 200 of content that is being inked and displayed in a number of contexts. FIG. 2 shows how the process can proceed through time as well as a number of devices.

The user device 202, the captured image storage 204, and the shared captured image device 206 can be separate devices. In an example, the captured image storage 204 may be located on the user device 202, the shared captured image device 206 or in a device or cloud separate from the user device 202 and the shared captured image device 206.

The user device 202 access content using a first context. At block 208, the user device 202 can detect content with a first context from a webpage or a digital book text or other reflowable content that is being accessed through a web browser. As a user is accessing the content, the user may make a user inking mark that can be grouped together based on the proximity and time of the creation of the user inking mark or marks. This grouping can be done at block 210 such that if the user inking mark is a single mark, then this single mark can be stored as a separate mark from other marks grouped separately according to a threshold distance and input time At block 212, the user device 202 can group the grouped user inking marks are treated similarly as the marks and the underling content are captured as an image. Capturing the underlying image can include capturing anything a certain distance from a mark, content parallel with a mark, or another segment of text otherwise informed by the location of the user inking mark. In an example, a bounding box is drawn around the group of ink strokes and the content within the bounding box is captured. A system can capture an image of inking input and the content area indicated by the inking image. In an example, a capture can include the capture of an ink stroke from identified inking input. In an example, an ink stroke includes a series of x, y coordinates and a coordinate offset. In an example, the ink stroke data may include ink color, ink stroke size, pressure information of the ink stroke. Captured information can be used to create ink strokes in a varied size and fidelity.

In block 214, the user inking mark as well as the underlying content can be rasterized as an image or PDF and can be stored locally along with pointer icon information that indicates where a captured image can be located. FIG. 2 shows at block 214, that the user inking marks can be stored locally in the user device 202 as well as stored in a captured image storage 204. As discussed above, the captured image storage 204 can be local or remote from the user device 202.

FIG. 2 shows, in part, two possible examples that allow the display of a pointer icon and a captured image in a reflown context. These examples include a local example and an example that involves a remote device.

In the local example, inking data that is stored locally to the user device 202 may be recalled when the annotated web page is opened on the user device at block 216. In response to the user device 202 detecting that an annotated webpage is being opened on the user device 202, at block 218, the user device may display the user inking marks in the original context or as pointer icons and captured images if displayed in a second context.

Alternatively, or in addition to the local example described above with regards to blocks 214-218, FIG. 2 shows an example of using a remote device to provide a pointer icon and a captured image to a user using blocks 220-224. In this remote example, FIG. 2 shows how the captured image storage 204 may receive and store the user inking mark and underlying content at block 220. Block 220 may also store the captured image pointer icon and a captured image for display on a device upon accessing the annotated webpage. Using the captured image storage 204, user inking marks along with underlying content can be roamed with a hosted roaming service. As used herein, the term roamed refers to the idea of moving data from one device to another based on the instructions of a roaming service. As used herein, a roaming service may direct data to be associated to a user and all data controlled by the roaming service and associated with the user would be migrated from one device to another in response to a detection that a user moves from one device to another. This detection of user movement can be monitored by user logins at various device. In an example, the roaming service may also move data based on whether or not the user of a device or the device itself has authorization to access the data being moved by the roaming service. In an example, consider a first user who sends a second user a link to a webpage that includes user input from the first user. This user input data if captured could be stored at a remote location managed by a roaming service such that if the first user sends the second user a link to the page where the first user made user input data could be roamed based on the sharing mechanism of the first user. In an example, the data to be roamed could include first user input that is captured and stored in a remote device and roamed or moved so that this user input data from the first user can be displayed on the device of a second user receiving the link in a message from the first user.

In an example, the user device 202 may not have stored the captured image and user inking marks and may request the captured image and pointer icon from the captured image storage 204. In example, the captured image storage 204 may provide the captured image and pointer icon to the shared captured image device. When the captured image and pointer icon is shared to the share captured image device, the shared captured image device 206 may use it in response to opening a web page in block 222, where the web page is determined to be associated with the captured image and captured image icon. In an example, determination of an association of a web page and a captured image can be through a detection that the webpage is being accessed by someone from a list of previously identified users. In an example, a determination of association of the captured image and a webpage can be based on permissions conveyed in an accessing link through use of keys and values in a query string requesting the webpage.

Using the captured image and captured image icon provided by the captured image storage 204, at block 224, the user inking mark can be displayed in line with the web page content accessed on a second device such as the shared captured image device 206 in a first or second context. The ink captured image appearing in a captured image such as a flyout panel can be a gif image snippet captured earlier that contains the rasterized version of ink strokes and content associated with it. It is possible to save the inked screen snippets as meta data associated with the page, and through this method the user can create and view ink on the original page.

The captured image storage 204 allows a user inking mark to be saved and shared without storing this information on the website hosting the marked-on content. The captured image storage 204 allows marking information to be stored and shared on content that may not be owned by a user. In an example, the user inking marks can be saved separate from the data of a third-party webpage as a separate layer stored in a separate device that can later be recalled to be displayed onto of the webpage in a different context or device.

FIG. 2 also shows that when a device wants to recall the captured image information at the same web page, then the user device 202 and the shared captured image device 206 may be called to present information. In this example, the user device 202 may present the web page content, and the second device may provide the captured image, pointer icon, where the pointer icon when selected can display a captured image such as a flyout panel.

The figures may describe the concepts in flowchart form. In this form, certain operations are described as constituting distinct blocks performed in a certain order. Such implementations are examples and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

Figure 3:
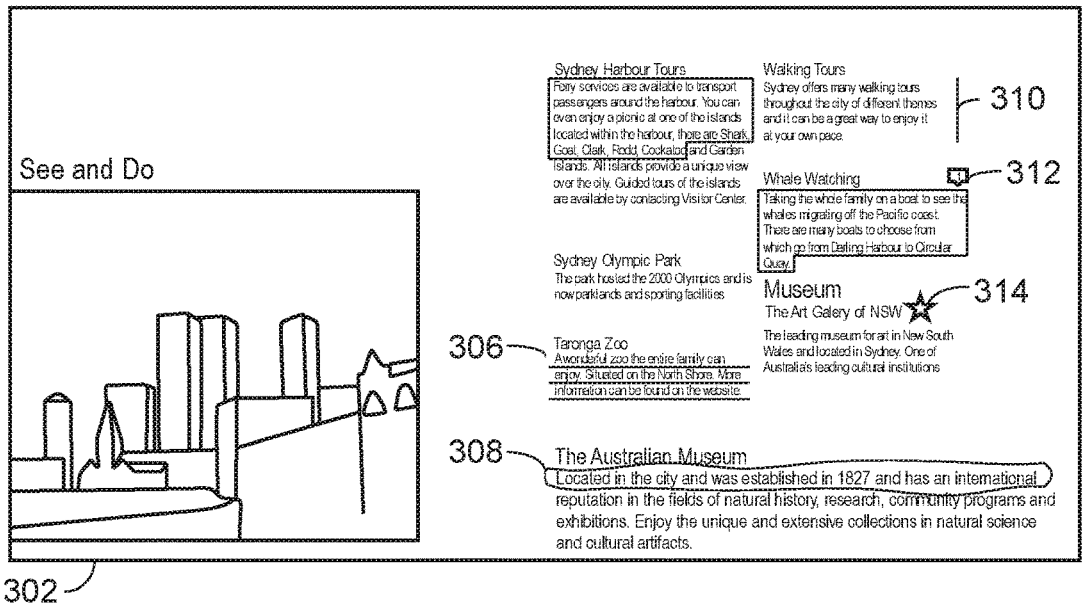
FIG. 3 is a schematic of an example of comparative visualization of how inked content can be displayed with varying orientations and ink types.
Figure 3:
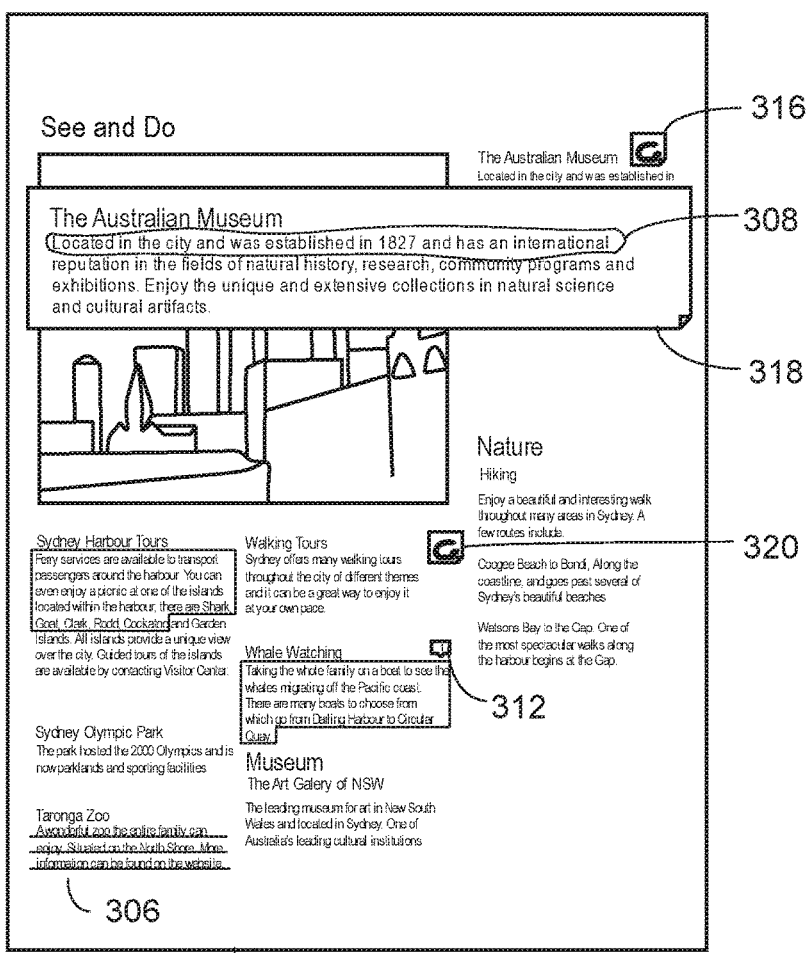

FIG. 3 is a comparative schematic of an example of comparative visualization 300 of how inked content can be displayed with varying orientations and ink types. This figure shows a first upper screen 302 that includes text and inking input or marks provided by a user and a second lower screen 304 as a new context or orientation of the same text and inking input. For example, the screens 302 and 304 could be in a tablet device that was inked in a horizontal orientation such as in the first upper screen 302, then viewed at a second time in a vertical orientation, such as in the second lower screen 304. In this second, vertical orientation, the content can be reflowed, and the inking may be reflowed as well, with captured images presented.

The first upper screen 302 can include underlining marking 306, circling marking 308, margin marking 310, highlighting marking 312, and staring marking 314. As used herein, staring marking refers to marking that can take the shape of a star. Other types of marking are possible as well including bullet marking, strikethrough lining, arrow marking, proofreading marking and other types of user markings. As used herein, proofreading marking refers to generally accepted freehand marks that refer to specific requests made by a reviewer of a drafter. In an example of proofreading marking, three horizontal lines under a lower case letter can indicate a reviewer would like the drafter to capitalize that letter. In an examples of proofreading marking, a hand drawn pilcrow can refer to a reviewer requesting a drafter to start a new paragraph at the notations location in the text.

The second lower screen 304 shows that the text section with the underlining marking 306 appears to be the same column width and text size as the first context in the first upper screen 302. A detection may be made indicating that the context for this content may not be reflown. In an example, if content is not reflown for a portion of content in a second context, the device may decide to display the user inking marking inline and not display the captured image or pointer icon. Similarly, as seen in FIG. 3, the highlighting marking 312 may be displayed inline even though some of the content has been reflown in the second context of the second lower screen 304. The highlighting marking 312 section remains highlighted in in response to a detection, by a processor executing instructions, that the underlying content of the highlight marking 312 has not been reflown.

The second lower screen 304 does appear to have reflown content near the circling marking 308 and the margin marking 310. When reflown content is detected that is associated with a user inking marking, then captured images can be displayed in the second context. In FIG. 3, there is a circling marking pointer icon 316 with the circling marking captured image 318 placed with the underlying content that has been reflown. As discussed above, clicking or activating the circling marking pointer icon 316 can toggle the display or hiding of the circling marking captured image 318, which is here shown as a flyout panel although other captured images are possible including margin captured images. A hidden captured image can been by comparison to the un-activated margin marking pointer icon 320.

In FIG. 3, the underlining marking 306 and the highlighting marking 312 do not change between contexts as the underlying content these marks were associated with is not reflown in the second context. Accordingly, the underlining marking 306 and the highlighting marking 312 may be displayed in as these marks were originally drawn. In an example, a display showing marking inline as the marks were originally drawn allows the display to avoid using or displaying captured images of these markings. A determination of whether content is being reflown can be based on a detection by the user's computing device of its orientation. In an example, device dimensions allow for a comparison to information provided with the inking data and the captured image data. In an example a comparison of dimensions may be used to assess if the orientation and context of a first display and a second display are the same.

FIG. 3 shows one implementation of logic used by a content inker to determine whether mark-up is displayed inline or not. For example, if the mark-up is anchored, as seen in case of 306 where the underline, it is created as an anchored underline no matter what layout we are in. As used herein, the status of underlining as anchored underlining may be made by an underlining utility of the content inker. In example, the underlining utility is aware of the content it is underlying and thus always associated with the content. As underlining can be indicated as anchored mark-up, the anchored underlining location may also be located with regards to text content allowing inline reflow of this markup.

In another example, the mark-up can be done using a freeform ink tool. For example, the circling marking 308 may have been formed by the freeform ink tool. A freeform ink tool allows drawing on content as if drawing on a physical paper in that the freeform ink tool considers the entire page as a single surface and does not interact with any text or other images on the underlying content. When any ink stroke is created with a freeform ink tool, the location of the ink stroke may be located with regard to canvas coordinates rather than through comparison to specific content items. In an example, the canvas coordinates may take into account x, y, coordinate offsets from top and left corner. Coordinates and offsets can be relative to a center point of the canvas as well. For inking input using a freeform ink tool, the content inker may present the captured image of the inking input through use of the annotation such as the captured image 308 and shown upon activation of a pointer icon 316.

Figure 4:
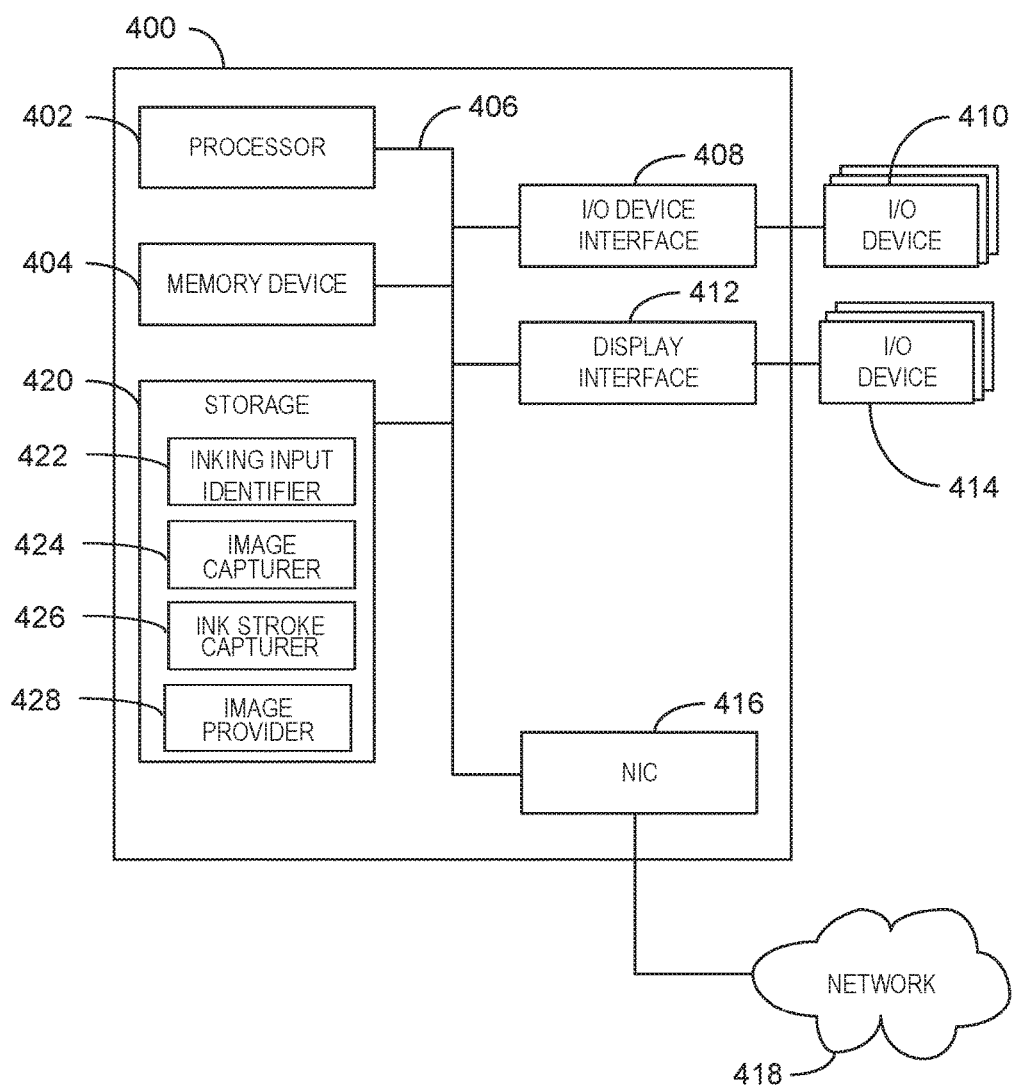
FIG. 4 is a block diagram of an example of a computing system for inking reflowable content.

FIG. 4 is a block diagram of an example of a computing system 400 for inking reflowable content. The computing system 400 may be, for example, a mobile phone, laptop computer, desktop computer, or tablet computer, among others. The computing system 400 may include a processor 402 that is adapted to execute stored instructions, as well as a memory device 404 that stores instructions that are executable by the processor 402. The processor 402 can be a single core processor, a multi-core processor, a computing cluster, or any number of other configurations. The memory device 404 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 402 may be connected through a system bus 406 (e.g., PCI, ISA, PCI-Express, NuBus, etc.) to an input/output (I/O) device interface 408 adapted to connect the computing system 400 to one or more I/O devices 410. The I/O devices 410 may include, for example, a keyboard, a gesture recognition input device, a voice recognition device, and a pointing device, wherein the pointing device may include a touchpad or a touchscreen, among others. The I/O devices 410 may be built-in components of the computing system 400, or may be devices that are externally connected to the computing system 400.

The processor 402 may also be linked through the system bus 406 to a display device interface 412 adapted to connect the computing system 400 to a display device 414. The display device 414 may include a display screen that is a built-in component of the computing system 400. The display device 414 may also include a computer monitor, television, or projector, among others, that is externally connected to the computing system 400. A network interface card (NIC) 416 may also be adapted to connect the computing system 400 through the system bus 406 to a network 418.

The storage 420 can include a hard drive, an optical drive, a USB flash drive, an array of drives, cloud storage, network area storage, or any other suitable storing means or combinations thereof. The storage 420 may include an inking input identifier 422, an image capturer 424, an ink stroke capturer 426, and a captured image provider 428.

The inking input identifier 422 is to identify inking input that occurs in a content area of a reflowable document. In an example, the inking input is identified as one or more of underlining, highlighting, circling, bulleting, margin marking, or a script note, among others. As used herein a script note can refer to handwritten words or marks identified as characters or recognized keyboard symbols.

The image capturer 424 is to capture an image of the inking input and the content area indicated by the inking input. In an example, the captured image is displayed inline in response to a detection that the inking input is underlining. In an example, the captured image is displayed in response to a pointer icon being selected by a detected user action. The pointer icon can be located in a content area within a pointer icon distance from the content area indicated by the inking input, where the pointer icon distance is the larger of a pointer width and a pointer height. The pointer may be located in the content area and does not cover the content area indicated by the inking input.

The ink stroke capturer 426 is to capture an ink stroke of an inking image. As described above, an ink stroke capturer 426 can capture an image of inking input and the content area indicated by the inking image. In an example, a capture can include the capture of an ink stroke from identified inking input. In an example, an ink stroke includes a series of x, y coordinates and a coordinate offset. In an example, the ink stroke data may include ink color, ink stroke size, pressure information of the ink stroke. Captured information can be used to create ink strokes in a varied size and fidelity.

The captured image provider 428 is to provide the captured ink stroke of the inking input and the captured image of the inking input for display in response to a detection that the reflowable document is being displayed in a modified context. The computing system 400 may also display a captured image on a side pane located in a margin of the content area. The computing system 400 can display a captured image in the content area in a modified context and hide the captured image in an original context. The storage 420 may further contain instructions that when executed on a processor 402 retrieves a captured image from a remote storage location for display in the content area. In an example, the storage 420 may further contain instructions that when executed on a processor 402 sends the captured image to a remote storage location.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, etc.). Furthermore, any of the functionalities of the inking input identifier 422, captured image capturer 424, and captured image provider 428 may be partially, or entirely, implemented in hardware and/or in the processing unit (also referred to herein as a processor) 402. For example, the functionality may be implemented with an application specific integrated circuit, in logic implemented in the processing unit 402, or in any other device.

Figure 5:
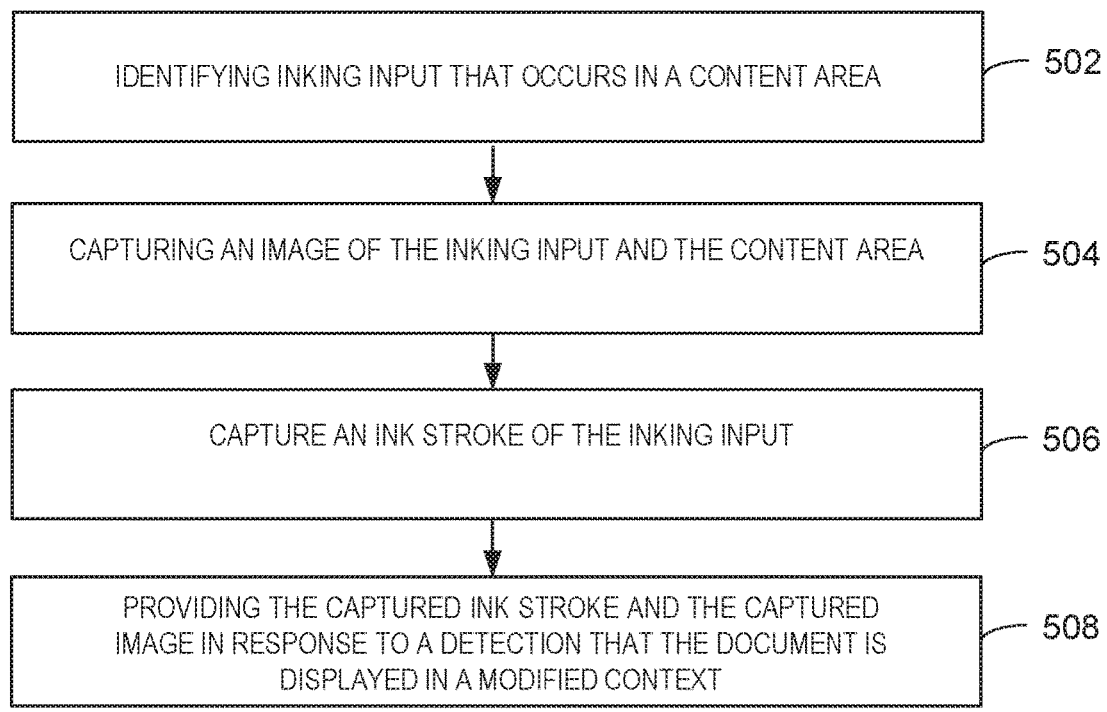
FIG. 5 is a process flow diagram of an example process for inking reflowable content.

FIG. 5 is a process flow diagram of an example method 500 for inking reflowable content. The elements of the method shown here are presented in an example order, and other orders of this method can also function. The method 500 can be implemented with any suitable computing device, such as the computing system 400 of FIG. 4.

At block 502, the method 500 includes identifying inking input that occurs in a content area of a reflowable document. In an example, the inking input is identified as one or more of underlining, highlighting, circling, bulleting, margin marking, or a script note, among others.

At block 504, the method 500 includes capturing an image of the inking input and the content area indicated by the inking input. In an example, the captured image is displayed inline in response to a detection that the inking input is underlining. In an example, the captured image is displayed in response to a pointer icon being selected by a detected user action. The pointer icon can be located in a content area within a pointer icon distance from the content area indicated by the inking input, where the pointer icon distance is the larger of a pointer width and a pointer height. The pointer may be located in the content area and may not cover the content area indicated by the inking input.

At block 506, the method 500 includes capturing an ink stroke of the inking input. An ink stroke capturer can capture an image of inking input and the content area indicated by the inking image. In an example, a capture can include the capture of an ink stroke from identified inking input. In an example, an ink stroke includes a series of x, y coordinates and a coordinate offset. In an example, the ink stroke data may include ink color, ink stroke size, pressure information of the ink stroke. Captured information can be used to create ink strokes in a varied size and fidelity.

At block 508, the method 500 includes providing the captured ink stroke and the captured image for display in response to a detection that the reflowable document is being displayed in a modified context. The method 500 may also display a captured image on a side pane located in a margin of the content area. The computing system 400 can display a captured image in the content area in a modified context and hide the captured image in an original context. The method 500 can retrieve a captured image from a remote storage location for display in the content area. In an example, the method 500 can send the captured image to a remote storage location.

The captured images of the inking input and the ink stroke information can be shared in a serialized format containing coordinates of the ink strokes with regard to the captured portion of the content. In an example, the serialized format includes at least one of ink stroke size, color, opacity, or pressure data. As discussed above, along with the inking input, the serialized format for inking input data may include the underlying content as an image and any extracted text from the content area. The serialized content of the inking input may also include an overall rasterized version of the ink stroke and underlying content. In an example where all types of serialization formats are used, they may all be captured and stored in a single gif image format as this format allows the embedding of these multiple data types as well as the image bitmap.

In an example, FIG. 5 is intended to indicate that the steps of the method 500 are to be executed in a particular order. Alternatively, in other examples, the steps of the method 500 can be executed in any suitable order and any suitable number of the steps of the method 500 can be included.

Figure 6:
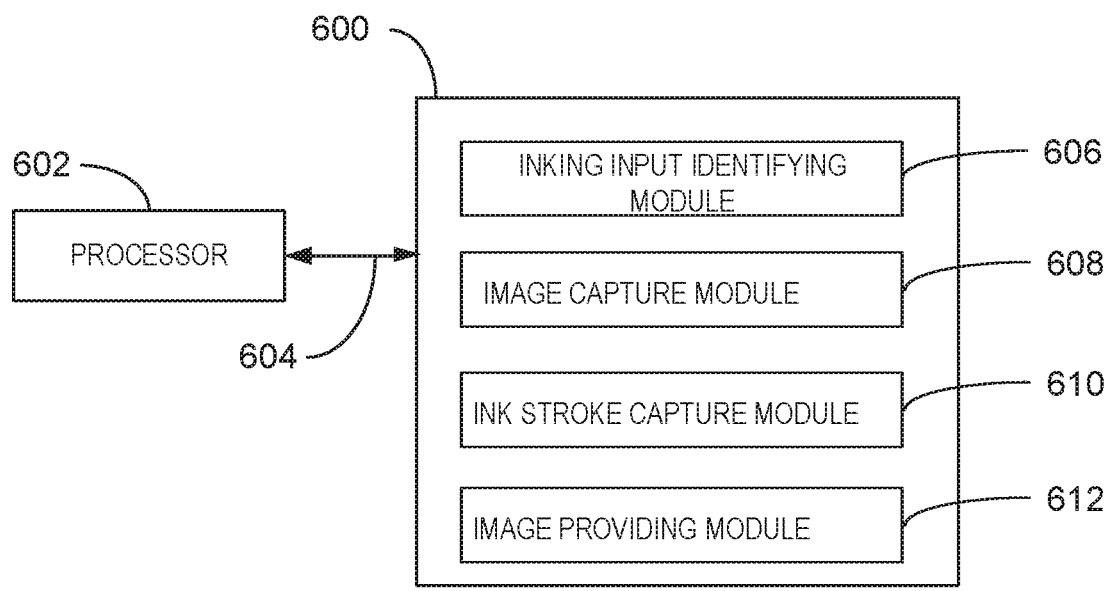
FIG. 6 is block diagram of an example computer-readable storage device for inking reflowable content.

FIG. 6 is block diagram of an example computer-readable storage media 600 for inking reflowable content. The various software components discussed herein may be stored on the tangible, computer-readable storage media 600, as indicated in FIG. 6. The tangible, computer-readable storage media 600 may be accessed by a processor 602 over a computer bus 604. Furthermore, the tangible, computer-readable storage media 600 may include code to direct the processor 602 to perform the steps of the current method 500.

The various software components discussed herein may be stored on the tangible, computer-readable storage media 600, as indicated in FIG. 6. For example, the tangible computer-readable storage media 600 can include an inking input identifying module 606 to identify inking input that occurs in a content area of a reflowable document. In an example, the inking input is identified as one or more of underlining, highlighting, circling, bulleting, margin marking, or a script note.

The tangible computer-readable storage media 600 can include an image capture module 608 to capture an image of the inking input and the content area indicated by the inking input. In an example, the captured image is displayed inline in response to a detection that the inking input is underlining. In an example, the captured image is displayed in response to a pointer icon being selected by a detected user action. The pointer icon can be located in a content area within a pointer icon distance from the content area indicated by the inking input, where the pointer icon distance is the larger of a pointer width and a pointer height. The pointer may be located in the content area and does not cover the content area indicated by the inking input.

The tangible computer-readable storage media 600 can include a captured ink stroke module 610 to capture an ink stroke from the inking input identified by the inking input module 606. In an example, an ink stroke includes a series of x, y coordinates and a coordinate offset. In an example, the ink stroke data may include ink color, ink stroke size, pressure information of the ink stroke. Captured information can be used to create ink strokes in a varied size and fidelity.

The tangible computer-readable storage media 600 can include a captured image providing module 612 to provide the captured ink stroke and the captured image for display in response to a detection that the reflowable document is being displayed in a modified context. The computer-readable storage media 600 may also include instructions that when executed on the processor 602 display a captured image on a side pane located in a margin of the content area. The computer-readable storage media 600 may also include instructions that when executed on the processor 602 can display a captured image in the content area in a modified context and hide the captured image in an original context. The computer-readable storage media 600 may also include instructions that when executed on the processor 602 retrieves a captured image from a remote storage location for display in the content area. In an example, the computer-readable storage media 600 may also include instructions that when executed on the processor 602 sends the captured image to a remote storage location.

It is to be understood that any number of additional software components not shown in FIG. 6 may be included within the tangible, computer-readable storage media 600, depending on the specific application. Although the subject matter has been described in language specific to structural features and/or methods, it is to be understood that the subject matter defined in the appended claims is not necessarily limited to the specific structural features or methods described above. The specific structural features and methods described above are disclosed as example forms of implementing the claims.

EXAMPLES

Example 1

In one example, a system for inking reflowable content includes a processor and a storage with instructions that, in response to execution by the processor, cause the processor to identify an inking input that occurs in a content area of a reflowable document. The processor can also include capturing an image of the inking input and the content area indicated by the inking input. The processor can also include providing the image of the inking input for display in response to a detection that the reflowable document is being displayed in a modified context.

Alternatively, or in addition, the processor is to identify the inking input as one or more of underlining, highlighting, circling, bulleting, margin marking, or a script note. Alternatively, or in addition, the processor is to display inline the image of the inking input in response to detecting that the inking input is underlining. Alternatively, or in addition, the processor is to display the image of the inking input in response to a pointer icon being selected by a detected user action. Alternatively, or in addition, the processor is to locate the pointer icon within a pointer icon distance from the content area indicated by the inking input, where the pointer icon distance is the larger of a pointer width and a pointer height. Alternatively, or in addition, the processor is to locate the pointer icon in the content area and does not cover the content area indicated by the inking input. Alternatively, or in addition, the processor is to display the image of the inking input on a side pane located in a margin of the content area. Alternatively, or in addition, the processor is to display the image of the inking input in the content area of the modified context and hide the image of the inking input in an original context. Alternatively, or in addition, the processor is to retrieve the image of the inking input from a storage location outside of the system for display in the content area. Alternatively, or in addition, the processor is to send the image of the inking input to a storage location outside of the system.

Example 2

In an example, a method for inking reflowable content, may include identifying an inking input that occurs in a content area of a reflowable document, capturing an image of the inking input and the content area indicated by the inking input, and providing the image of the inking input for display in response to a detection that the reflowable document is being displayed in a modified context. Alternatively, or in addition, the method can include identifying the inking as one or more of underlining, highlighting, circling, bulleting, margin marking, or a script note. Alternatively, or in addition the method includes displaying the image of the inking input inline in response to detecting that the inking input is underlining. Alternatively, or in addition, the method displays the image of the inking input in response to a pointer icon being selected by a detected user action. Alternatively, or in addition, the method locates the pointer icon within a pointer icon distance from the content area indicated by the inking input, where the pointer icon distance is the larger of a pointer width and a pointer height. Alternatively, or in addition, the method locates the pointer in the content area and does not cover the content area indicated by the inking input. Alternatively, or in addition, the method displays the image of the inking input on a side pane located in a margin of the content area. Alternatively, or in addition, the method displays the image of the inking input in the content area in the modified context and hide the image of the inking input in an original context. Alternatively, or in addition, the method retrieves the image of the inking input from a storage location outside of the storage location for display in the content area.

Example 3

In one example, a computer-readable storage device stores instructions that, in response to an execution by a processor, cause the processor to identify an inking input that occurs in a content area of a reflowable document, capture an image of the inking input and the content area indicated by the inking input, and provide the image of the inking input for display in response to a detection that the reflowable document is being displayed in a modified context.

What is claimed is:

1. A system for inking reflowable content comprising:
   a processor; and
   a storage with instructions that, in response to execution by the processor, cause the processor to:
      identify an inking input that occurs in a content area of a reflow able document;
      capture an inked screen snippet of the inking input together with the content area, the content area showing an original context of the content in the content area within a threshold distance of the inking input;
      capture an ink stroke of the inking input; and
      provide the ink stroke of the inking input and the inked screen snippet of the inking input together with the content area, the content area showing the original context of the content in the content area within the threshold distance of the inking input, for display in response to a detection that the reflowable document is being displayed in a modified context.

2. The system of claim 1, wherein the processor is to identify the inking input as one or more of underlining, highlighting, circling, bulleting, margin marking, or a script note.

3. The system of claim 1, wherein the ink stroke comprises a series of x, y coordinates, a coordinate offset, an ink color, an ink stroke size, and pressure information of the ink stroke.

4. The system of claim 1, wherein the processor is to display the inked screen snippet of the inking input in response to a pointer icon being selected by a detected user action.

5. The system of claim 4, wherein processor is to locate the pointer icon within a pointer icon distance from the content area indicated by the inking input, where the pointer icon distance is the larger of a pointer width and a pointer height.

6. The system of claim 4, wherein the processor is to locate the pointer icon in the content area and does not cover the content area indicated by the inking input.

7. The system of claim 1, wherein the processor is to display the inked screen snippet of the inking input on a side pane located in a margin of the content area.

8. The system of claim 1, wherein the processor is to display the inked screen snippet of the inking input in the content area of the modified context and hide the inked screen snippet of the inking input in the original context.

9. The system of claim 1, wherein the processor is to retrieve the inked screen snippet of the inking input from a storage location outside of the system for display in the content area.

10. The system of claim 1, wherein the processor is to send the inked screen snippet of the inking input to a storage location outside of the system.

11. A method for inking reflowable content, comprising:
    identifying an inking input that occurs in a content area of a reflowable document;
    capturing an inked screen snippet of the inking input together with the content area showing an original context of the content in the content area within a threshold distance of the inking input;
    capturing an ink stroke of the inking input; and
    providing the ink stroke of the inking input and the inked screen snippet of the inking input together with the content area, the content area showing the original context of the content in the content area within the threshold distance of the inking input for display in response to a detection that the reflowable document is being displayed in a modified context.

12. The method of claim 11, wherein the inking input is identified as one or more of underlining, highlighting, circling, bulleting, margin marking, or a script note.

13. The method of claim 11, wherein the inked screen snippet of the inking input is displayed inline in response to detecting that the inking input is underlining.

14. The method of claim 11, wherein the inked screen snippet of the inking input is displayed in response to a pointer icon being selected by a detected user action.

15. The method of claim 14, wherein the pointer icon is located within a pointer icon distance from the content area indicated by the inking input, where the pointer icon distance is the larger of a pointer width and a pointer height.

16. The method of claim 14, wherein the pointer is located in the content area and does not cover the content area indicated by the inking input.

17. The method of claim 11, comprising displaying the inked screen snippet of the inking input on a side pane located in a margin of the content area.

18. The method of claim 11, comprising displaying the inked screen snippet of the inking input in the content area in the modified context and hide the image inked screen snippet of the inking input in the original context.

19. The method of claim 11, comprising retrieving the inked screen snippet of the inking input from a storage location outside of the storage location for display in the content area.

\* \* \* \* \*